(12) United States Patent
Oh et al.

(10) Patent No.: US 8,135,901 B2
(45) Date of Patent: Mar. 13, 2012

(54) SOLID STATE MEMORY (SSM), COMPUTER SYSTEM INCLUDING AN SSM, AND METHOD OF OPERATING AN SSM

(75) Inventors: Sang-Jin Oh, Suwon (KR); Moon-Wook Oh, Seoul (KR); Chan-Ik Park, Seoul (KR); Sung-Chul Kim, Hwasung (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 665 days.

(21) Appl. No.: 12/255,759

(22) Filed: Oct. 22, 2008

(65) Prior Publication Data

US 2009/0119353 A1      May 7, 2009

(30) Foreign Application Priority Data

Nov. 6, 2007   (KR) .................. 10-2007-0112791

(51) Int. Cl.
*G06F 12/00* (2006.01)
(52) U.S. Cl. .. 711/103; 711/170; 711/173; 711/E12.001
(58) Field of Classification Search .................. None
See application file for complete search history.

(56) References Cited

U.S. PATENT DOCUMENTS

| | | | |
|---|---|---|---|
| 5,671,388 A | 9/1997 | Hasbun | |
| 6,785,767 B2 | 8/2004 | Coulson | |
| 2006/0020744 A1* | 1/2006 | Sinclair et al. | 711/103 |
| 2006/0179263 A1 | 8/2006 | Song et al. | |
| 2007/0033373 A1* | 2/2007 | Sinclair | 711/203 |
| 2007/0150691 A1* | 6/2007 | Illendula et al. | 711/170 |
| 2007/0156998 A1* | 7/2007 | Gorobets | 711/170 |
| 2007/0233941 A1* | 10/2007 | Lee et al. | 711/103 |

FOREIGN PATENT DOCUMENTS

| | | |
|---|---|---|
| CN | 1225476 A | 8/1999 |
| JP | 2006-216036 | 8/2006 |
| JP | 2006-319728 | 11/2006 |
| KR | 1020010047092 A | 6/2001 |
| KR | 1020060089491 A | 8/2006 |

OTHER PUBLICATIONS

"NTFS" Aug. 11, 2007, [online], [retrieved on Jun. 18, 2011 using Internet Archive Wayback Machine] Retrieved from Webopedia <http://www.webopedia.com/TERM/N/NTFS.html>.*

Seung-Ho Lim; Kyu-Ho Park; , "An efficient NAND flash file system for flash memory storage," Computers, IEEE Transactions on , vol. 55, No. 7, pp. 906-912, Jul. 2006 doi: 10.1109/TC.2006.96 URL: http://ieeexplore.ieee.org/stamp/stamp.jsp?tp=&arnumber=1637405&isnumber=34313.*

(Continued)

*Primary Examiner* — Edward Dudek, Jr.
*Assistant Examiner* — Ralph A Verderamo, III
(74) *Attorney, Agent, or Firm* — Volentine & Whitt, PLLC

(57) ABSTRACT

In one aspect, a determination is made as whether partition metadata of a solid state memory has changed, and if so, the partition metadata is analyzed to locate invalid data stored in the solid state memory. This analysis may include determining that a file system type of a partition has changed, and invalidating data in response to the changed file system type. Alternately, or in addition, the analysis may include determining that a partition has changed, and invalidating data in response to the changed partition.

11 Claims, 12 Drawing Sheets

OTHER PUBLICATIONS

Mylavarapu, S.K.; Choudhuri, S.; Shrivastava, A.; Jongeun Lee; Givargis, T.; , "FSAF: File system aware flash translation layer for NAND Flash Memories," Design, Automation & Test in Europe Conference & Exhibition, 2009. Date '09. , vol., No., pp. 399-404, Apr. 20-24, 2009 URL: http://ieeexplore.ieee.org/stamp/stamp.jsp?tp=&arnumber=5090696&isnumber.*

* cited by examiner

Fig. 3

Structure of a Master Boot Record:

| Address | | Description | Size in bytes |
|---|---|---|---|
| Hex | Dec | | |
| 0000 | 0 | Code Area | max. 446 |
| 01B8 | 440 | Optional Disk signature | 4 |
| 01BC | 444 | Usually Nulls:0x0000 | 2 |
| 01BE | 446 | Table of primary partitions (Four 16-byte entries, IBM Partition Table scheme) | 64 |
| 01FE | 510 | 55h — MBR signature: 0xAA55 | 2 |
| 01FF | 511 | AAh | |
| MBR, total size:446+64+2 = | | | 512 |

Fig. 4

Layer of one 16-byte partition record

| Offset | Description |
|---|---|
| 0x00 | (1 byte) Status[2] (0x80=bootable, 0x00= non-bootable, other=malformed[3]) |
| 0x01 | (3 byte) Cylinder-head-sector address of the first sector in the partition[4] |
| 0x04 | (1 byte) Partition type[5] |
| 0x05 | (3 byte) Cylinder-head-sector address of the last sector in the partition[5] |
| 0x08 | (4 byte) Logical block address of the first sector in the partition |
| 0x0C | (4 byte) Length of the partition, in sectors |

Fig. 5

| Partition Type ID Value | |
|---|---|
| 0x01 | FAT12 primary partition or logical drive (fewer then 32,680 sectors in the volume) |
| 0x04 | FAT16 partition or logical drive (32,680-65,535 sectors or 16 MB-33 MB) |
| 0x05 | Extended partition |
| 0x06 | BIGDOS FAT16 partition or logical drive (33 MB-4GB) |
| 0x07 | Installable File System (NTFS partition or logical drive) |
| 0x0B | FAT32 partition or logical drive |

SOLID STATE MEMORY (SSM), COMPUTER SYSTEM INCLUDING AN SSM, AND METHOD OF OPERATING AN SSM

PRIORITY CLAIM

A claim of priority is made to Korean patent application no. 2007-112791, filed Nov. 6, 2007, the entire contents of which are incorporated herein by reference.

SUMMARY

The present invention generally relates to memory systems, and more particularly, the present invention relates to a solid state memory (SSM), a computer system which includes an SSM, and a method of operating an SSM. Examples of the SSM include the main memory of a computer system and the solid state drive (SSD) of a computer system.

A solid state drive (SSD) is a data storage device that typically emulates a conventional hard disk drive (HDD), thus easily replacing the HDD in most applications. In contrast to the rotating disk medium of an HDD, an SSD utilizes solid state memory to store data. With no moving parts, an SSD largely eliminates seek time, latency and other electromechanical delays and failures associated with a conventional HDD.

An SSD is commonly composed of either NAND flash (non-volatile) or SDRAM (volatile).

SSDs based on volatile memory such as SDRAM are characterized by fast data access and are used primarily to accelerate applications that would otherwise be held back by the latency of disk drives. The volatile memory of the DRAM-based SSDs typically requires the inclusion of an internal battery and a backup disk system to ensure data persistence. If power is lost, the battery maintains power for sufficient duration of copy data from the SDRAM to the backup disk system. Upon restoration of power, data is copied back from the backup disk to SDRAM, at which time the SSD resumes normal operations.

However, most SSD manufacturers use non-volatile flash memory to create more rugged and compact alternatives to DRAM-based SSDs. These flash memory-based SSDs, also known as flash drives, do not require batteries, allowing makers to more easily replicate standard hard disk drives. In addition, non-volatile flash SSDs retain memory during power loss.

According to an aspect of the present invention, a method of operating a solid state memory system is provided. The method includes logically partitioning the solid state memory system, updating metadata of the logically partitioned solid state memory, and monitoring the updated metadata to locate invalid data stored in the solid state memory system.

According to another aspect of the present invention, a method of operating a logically partitioned solid state memory system is provided. The method includes determining whether partition metadata of the solid state memory has changed, and analyzing the partition metadata to locate invalid data stored in the solid state memory.

According to yet another aspect of the present invention, a solid state memory system is provided. The solid state memory system includes a solid state memory and a controller, where the controller is configured to logically partition the solid state memory, update metadata of the logically partitioned solid state memory, and monitor the updated metadata to locate invalid data stored in the solid state memory system.

According to still another aspect of the present invention, a computer system is provided which includes a bus system, a read-only memory which is connected to the bus system and stores software utilized to initialize the computer system, a random access memory which is connected to the bus system and functions as a working memory, a central processing unit, and a solid state memory system which is connected to the bus system and includes a solid state memory and a controller. The controller is configured to logically partition the solid state memory, update metadata of the logically partitioned solid state memory, and monitor the updated metadata to locate invalid data stored in the solid state memory system.

BRIEF DESCRIPTION OF THE DRAWINGS

The above and other aspects and features of the present invention will become readily apparent from the detailed description that follows, with reference to the accompanying drawings, in which:

FIG. 3 is a schematic diagram illustrating the structure of a Master Boot Record (MBR);

FIG. 4 is a schematic diagram illustrating a partition record contained in the MBR of FIG. 3;

FIG. 5 is a table illustrating partition types and corresponding ID values;

DETAILED DESCRIPTION OF PREFERRED EMBODIMENTS

The present invention will now be described by way of preferred, but non-limiting, embodiments of the invention. It is emphasized here that the invention is not limited by the exemplary embodiments described below, and that instead the scope of the invention is delimited by the appended claims.

Figure 1:
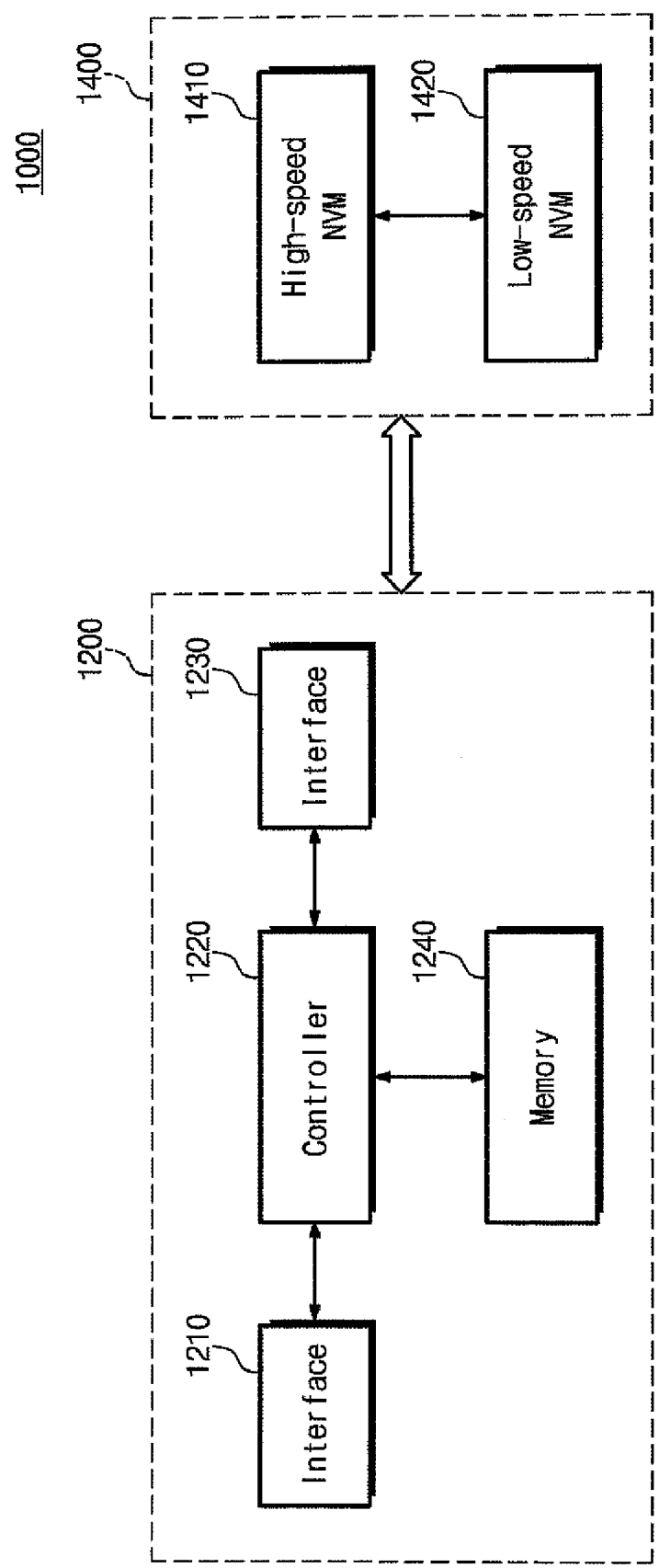
FIG. 1 is a block diagram of a solid state drive (SSD) according to an embodiment of the present invention.

FIG. 1 illustrates a block diagram of a solid state drive (SSD) 1000 according to an embodiment of the present invention. As shown, the SSD 1000 of this example includes an SSD controller 1200 and non-volatile storage media 1400.

The SSD controller 1200 includes first and second interfaces 1210 and 1230, a controller 1220, and a memory 1240.

The first interface 1210 functions as a data I/O interface with a host device, such as a host central processing unit (CPU) (not shown). Non-limiting examples of the first interface 1210 include Universal Serial Bus (USB) interfaces, Advanced Technology Attachment (ATA) interfaces, Serial ATA (SATA) interfaces, Small Computer System Interface (SCSI) interfaces.

The second interface 1230 functions as a data I/O interface with the non-volatile storage media 1400. In particular, the second interface 1230 is utilized to transmit/receive various commands, addresses and data to/from the non-volatile storage media 1400. As will be apparent to those skilled in the art, a variety of different structures and configurations of the second interface 1230 are possible, and thus a detailed description thereof is omitted here for brevity.

The controller 1220 and memory 1240 are operatively connected between the first and second interfaces 1210 and 1230, and together function to control/manage the flow of data between the host device (not shown) and the non-volatile storage media 1400. The memory 1240 may, for example, be a DRAM type of memory device, and the controller 1220 may, for example, include a central processing unit (CPU), a direct memory access (DMA) controller, and an error correction control (ECC) engine. Examples of controller functionality may be found in commonly assigned U.S. Patent Publication 2006-0152981, which is incorporated herein by reference. The operations generally executed by controller 1220 (and memory 1240) to transfer data between the host device (not shown) and SSD memory banks are understood by those skilled in the art, and thus a detailed description thereof is omitted here for brevity. Rather, the operational description presented later herein is primarily focused on inventive aspects relating to various embodiments of the invention.

Still referring to FIG. 1, the non-volatile storage media 1400 of this example includes a high-speed non-volatile memory (NVM) 1410 and a low-speed non-volatile memory (NVM) 1420. However, the embodiments herein are not limited configurations containing dual-speed memories. That is, the non-volatile storage media 1400 may instead be composed of a single type of memory operating at a single speed.

As the names suggest, the high-speed NVM 1410 is capable of operating at a relatively higher speed (e.g., random write speed) when compared to the low-speed NVM 1420.

In an exemplary embodiment, the high-speed NVM 1410 is single-level cell (SLC) flash memory, and the low-speed NVM 1420 is multi-level cell (MLC) flash memory. However, the invention is not limited in this respect. For example, the high-speed NVM 1410 may instead be comprised of phase-change random access memory (PRAM), or MLC flash memory in which one bit per cell is utilized. Also, the high-speed NVM 1410 and the low-speed NVM 1420 may be comprised of the same type of memory (e.g., SLC or MLC or PRAM), where the operational speed is differentiated by fine-grain mapping in the high-speed NVM 1410 and coarse-grain mapping in the low-speed NVM 1420.

Generally, the high-speed NVM 1410 is utilized to store frequently accessed (written) data such as metadata, and the low-speed NVM 1420 is utilized to store less frequently accessed (written) data such as media data. In other words, as will discussed later herein, a write frequency of data in the high-speed NVM 1410 is statistically higher than a write frequency of data in the low-speed NVM 1420. Also, due to the nature of the respective data being stored, the storage capacity of the low-speed NVM 1420 will typically be much higher than that of the high-speed NVM 1410. A more detailed discussion of examples in which high-speed and low-speed memories are efficiently utilized to store different types of data can be found in commonly assigned U.S. non-provisional application Ser. No. 12/015,548, filed Jan. 17, 2008, the entire contents of which are incorporated herein by reference. Again, however, the embodiments herein are not limited to the use of two or more memories operating at different speeds.

Figure 2:
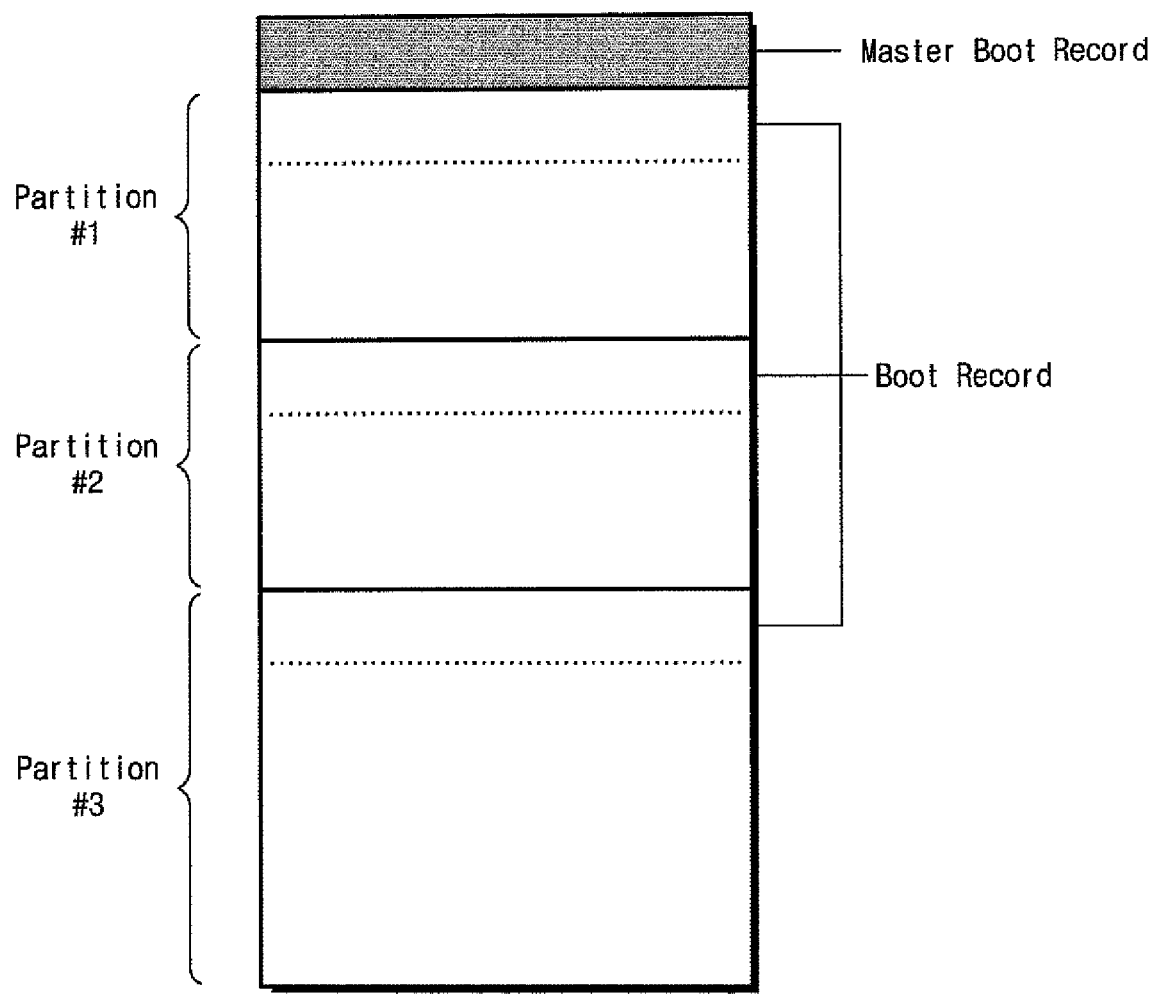
FIG. 2 is a schematic diagram illustrating the logical partitioning of a memory of a solid state drive.

FIG. 2 illustrates an example of the logical partitioning of the non-volatile storage media 1400. As shown, the first "sector" of the solid-state memory contains a master boot record (MBR), and remaining sectors of the memory are divided into a number of partitions. In addition, each partition generally includes a boot record at a logical front end thereof.

FIG. 3 illustrates a well-known 512-byte example of the MBR shown in FIG. 2. Generally, the MBR is utilized, for example, to maintain the primary partition table of the solid-state memory. It may also be used in bootstrapping operations after the computer system's BIOS transfers execution to machine code instructions contained within the MBR. The MBR may also be used to uniquely identify individual storage media.

FIG. 4 illustrates an example of the layout of a single 16-byte partition record of the MBR illustrated in FIG. 3. In the example of the IBM Partition Table standard, four (4) of the partition records illustrated in FIG. 4 are contained with the partition table of the MBR.

FIG. 5 is a table illustrating partition types and corresponding ID values. In this respect, the Operating System (O/S) of can additionally create a plurality of partition in specified primary partition. These partitions are referred to as "Extended Partition". Each partition created on extended partition is called as logical partition, and each logical partition can adapt the same or different file system.

It is noted here that the above-described MBR scheme represents just one of several standards in an ever-evolving industry. For example, the Extensible Firmware Interface (EFI) standard has been proposed as a replacement for the PC BIOS standard. Whereas PC BIOS utilizes the MBR scheme as described above, the EFI standard utilizes a Globally Unique Identifier (GUID) Partition Table (GPT) as the standard for the layout of a partition table in a logically partitioned solid-state drive. The present invention is not limited to any particular partitioning standard.

Data contained in the MBR's (or GUID) partitioning table of FIG. 3 is an example of "storage-level" metadata, i.e., metadata associated with logical storage areas of the solid state memory. This is in contrast with "file system level" metadata which is metadata associated with the file system of the computer system. File system examples include File Allocation Table (FAT), New Technology File System (NTFS), Second and Third Extended File Systems (ext2 and ext3).

That is, when a user deletes a file in the solid state memory 1400, the file system running on the system processes the delete command and, from the user's point of view, appears to remove the file from memory 1400. In reality, however, conventional file systems leave the file data in physical memory, and instead, the data is deemed "invalid". A host system includes an application program that communicates with a file system. A Flash Translation Layer (FTL) keeps track of the physical location of memory units associated with files in the solid state memory 1400 so the file system need only reference logical memory units.

As will be explained in more detail below, embodiments of the invention are at least partially directed to monitoring updated metadata in order locate the positions of invalid data stored in the solid state memory system.

The metadata that is monitored may be storage level metadata or file system level metadata. In the case of storage level metadata, for example, the metadata may be contained in a partition table, and invalid data is located in accordance with changes in the metadata of the partition table.

In one embodiment, for example, a determination is made as whether partition metadata of the solid state memory has changed, and if so, the partition metadata is analyzed to locate invalid data stored in the solid state memory. This analysis may include determining that a file system type of a partition has changed, and invalidating data in response to the changed file system type. Alternately, or in addition, the analysis may include determining that a partition has changed, and invalidating data in response to the changed partition.

Figure 6:
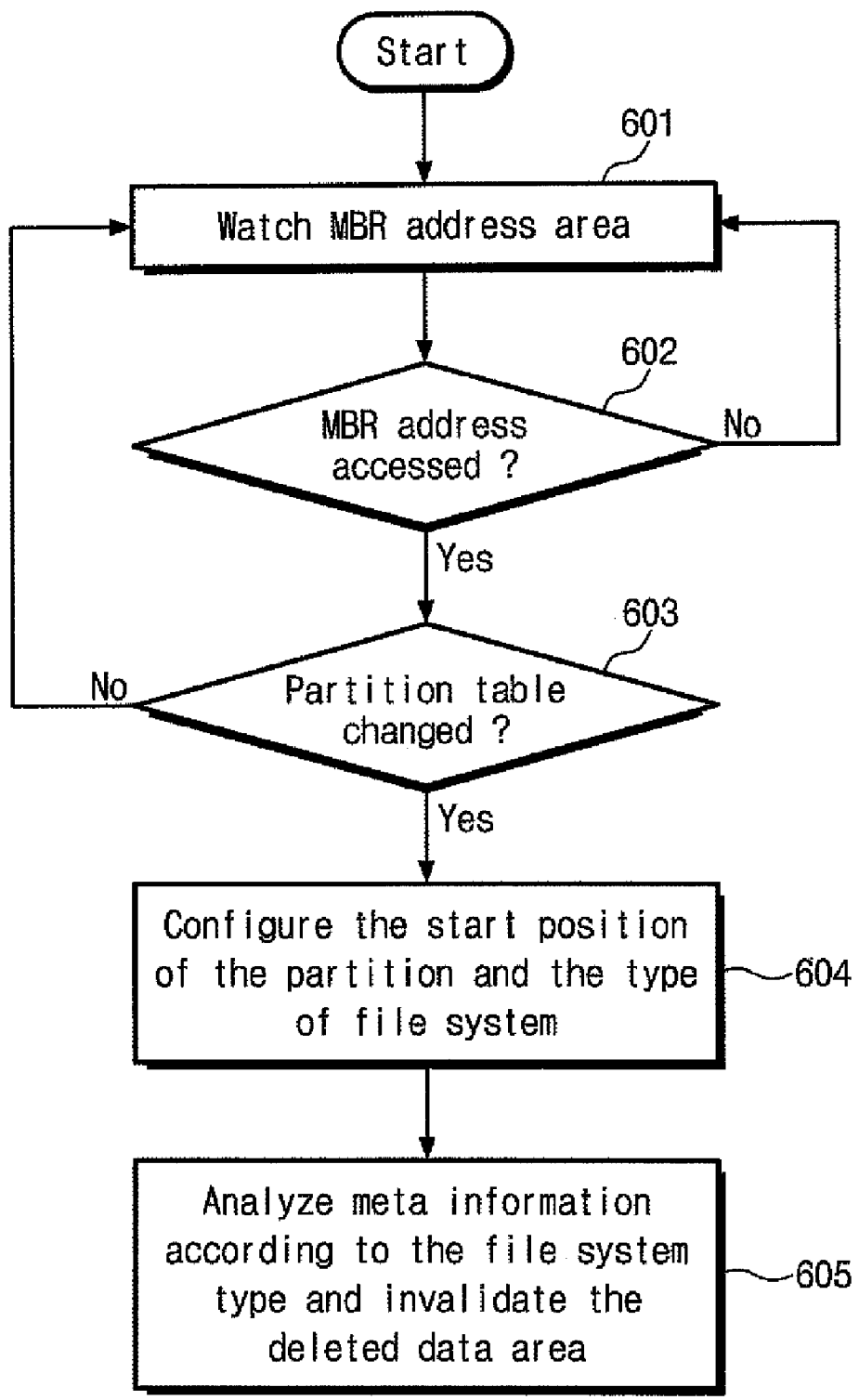
FIGS. 6 and 7 are a flow chart and schematic diagram, respectively, for use in describing a method of locating invalid data area according to an embodiment of the present invention.
Figure 7:
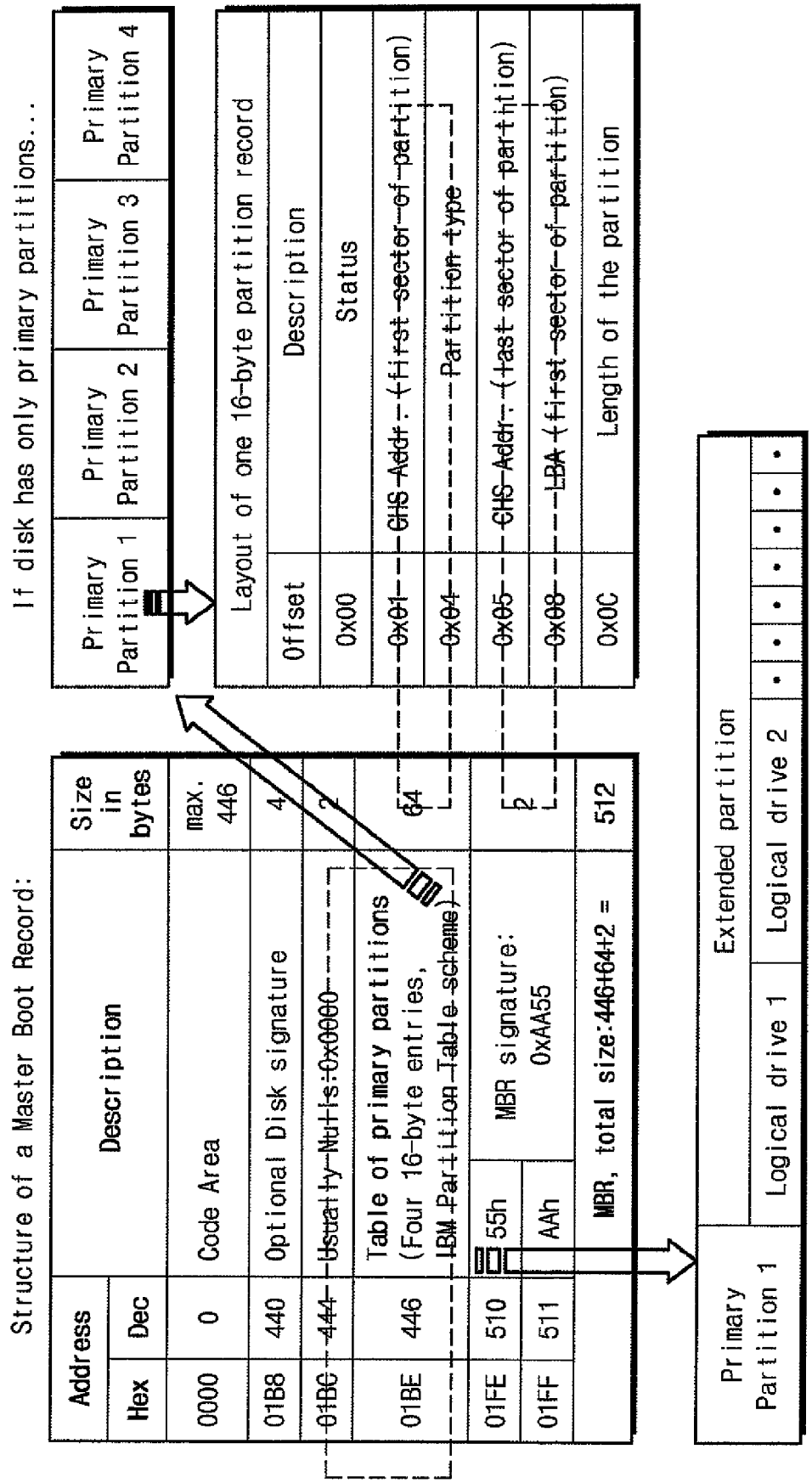

Reference is now made to FIGS. 6 and 7 with respect to method of invalidating a deleted data area of a solid state memory according to an embodiment of the present invention.

Generally, this embodiment relates to the monitoring of metadata contained in a partition table, such as the standard Table of Primary Partitions of an MBR in a BIOS system. In step 601 and 602 of FIG. 6, the MBR address area is monitored to determine whether an MBR address has been accessed. Examples of the MBR, primary partitions, and partition record are illustrated in FIG. 7.

Once it has been determined that an MBR address has been accessed, a determination is made at step 603 as to whether the Partition Table has been changed. For example, the Partition Table may be altered in the situation where a partition is divided. In this case, all data in the divided partition becomes invalid.

In the case of an affirmative determination at step 603, the start position of the partition and the type of file system (partition type) are configured in step 604 of FIG. 6. Then, at step 605, the metadata is analyzed according to the file system type, and the deleted data area is invalidated.

Figure 8:
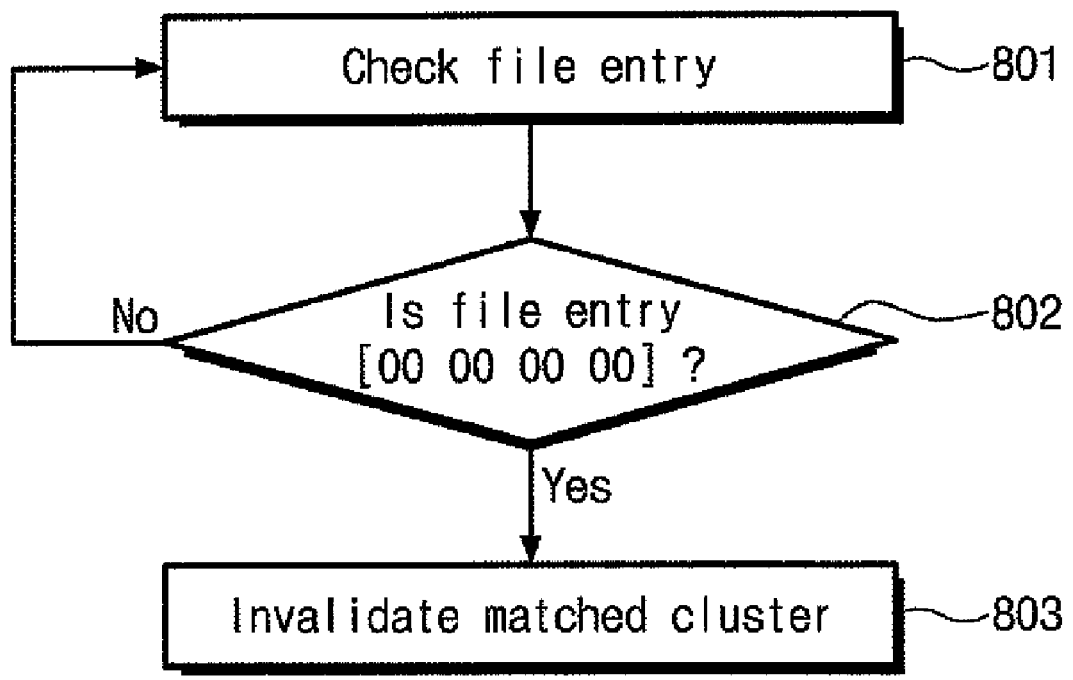
FIGS. 8 and 9 are a flow chart and schematic diagram, respectively, for use in describing a method of locating invalid data area according to an embodiment of the present invention.
Figure 9:
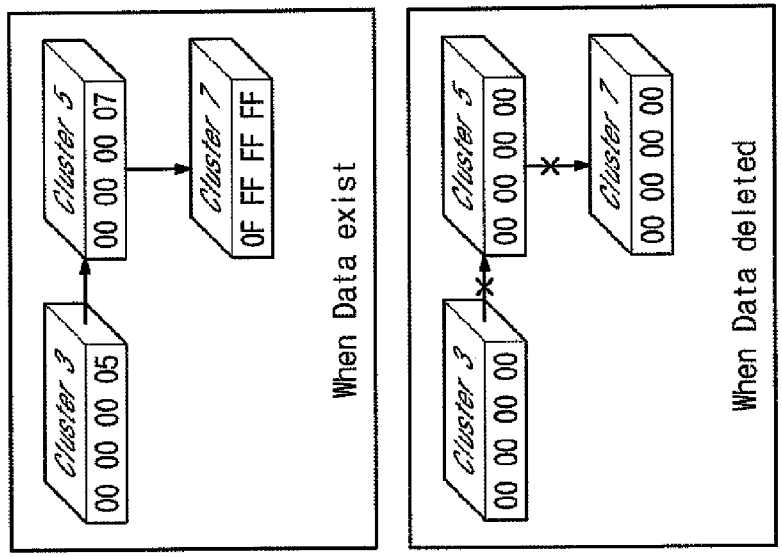

Reference is now made to FIGS. 8 and 9 with respect to method of invalidating a deleted data area of a solid state memory according to an embodiment of the present invention.

Generally, this embodiment relates to the monitoring of metadata contained in a File Allocation Table (FAT). In particular, by examining cluster linkages (or lack thereof), a determination is made as to whether data associated with the clusters is deleted data.

Generally, a file system that may be used to store files in a flash type solid state memory have a unit of memory allocation defined that specifies the smallest logical amount of disk space that can be allocated to hold a file. For example, the MS-DOS file system known as the File Allocation Table (FAT) calls this unit of memory allocation a cluster.

In the method of FIG. 8, the file entry is initially checked at step 801, and at step 802, a determination is made as to whether the file entry is [00 00 00 00]. If the determination at step 802 is affirmative, the matched clusters are not linked and the data thereof is invalidated at step 803.

Figure 10:
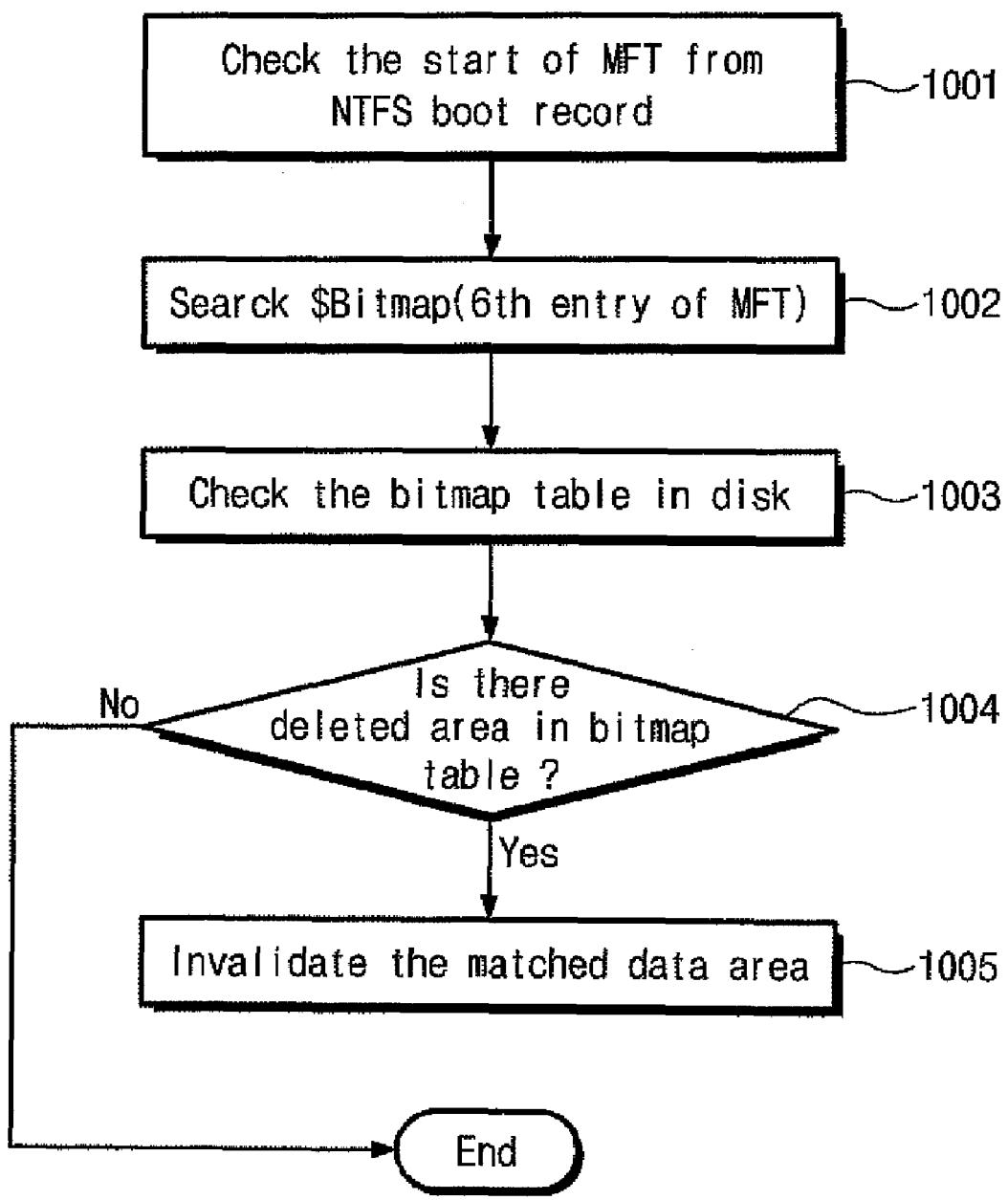
FIGS. 10 and 11 are a flow chart and schematic diagram, respectively, for use in describing a method of locating invalid data area according to an embodiment of the present invention.
Figure 11:
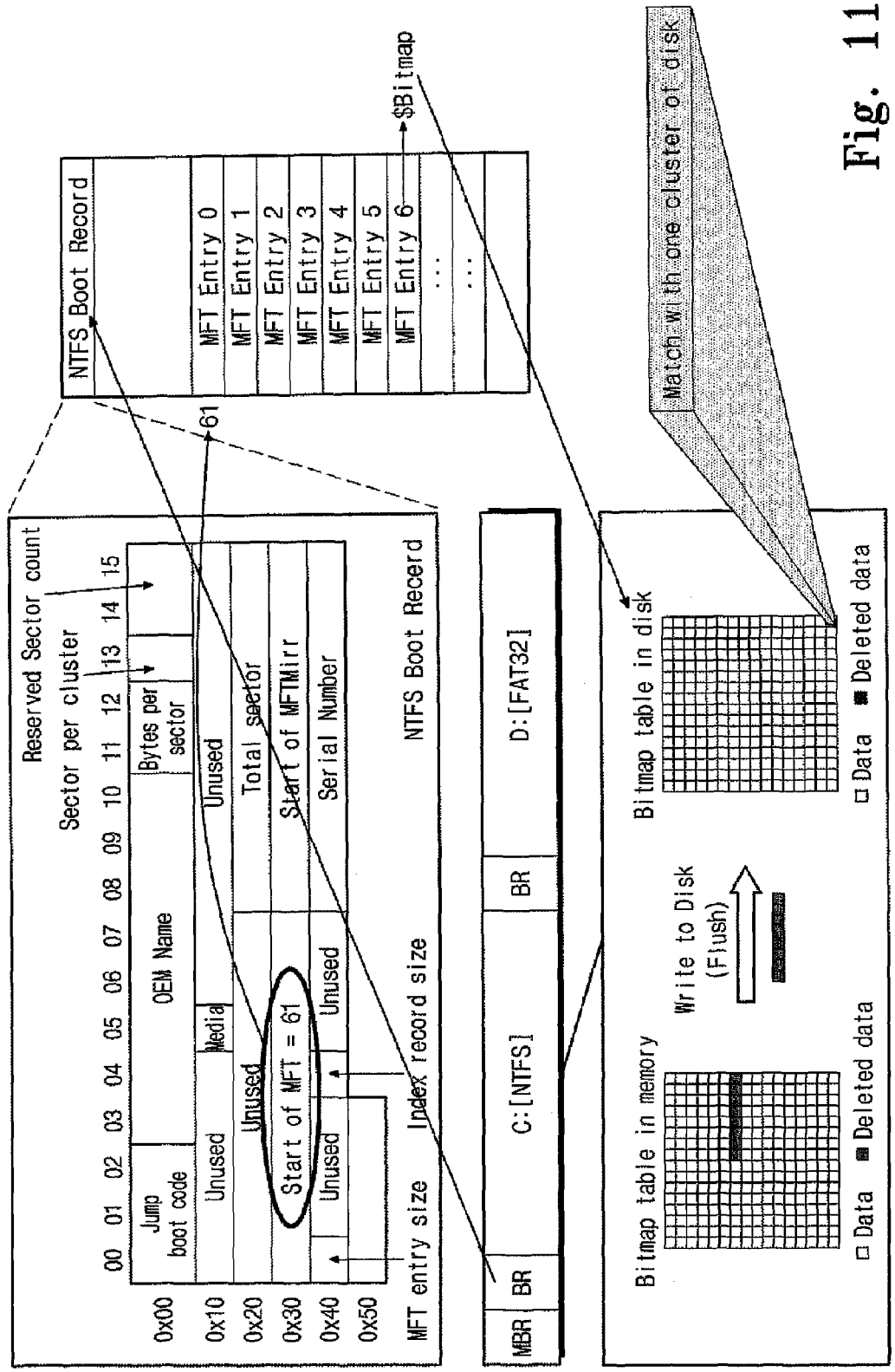

Reference is now made to FIGS. 10 and 11 with respect to method of invalidating a deleted data area of a solid state memory according to an embodiment of the present invention.

Generally, this embodiment relates to the monitoring of metadata contained in the New Technology File System (NTFS). In an initial step 1001, the start of the Master File Table (MFT) from the NTFS boot record is checked. In this example, the $Bitmap which is the sixth ($6^{th}$) entry of the MFT is then searched at step 1002, and then the bitmap table is checked at step 1003. A determination is then made as to whether a deleted area exists in the bitmap table at step 1004, and if the answer is affirmative, the matched data area is invalidated.

By invalidating data or data areas as described above, it becomes possible to execute a merge operation in the solid state disk (SSD) drive without copying the invalid data. In addition, for example, garbage collection systems can be made more efficient.

Figure 12:
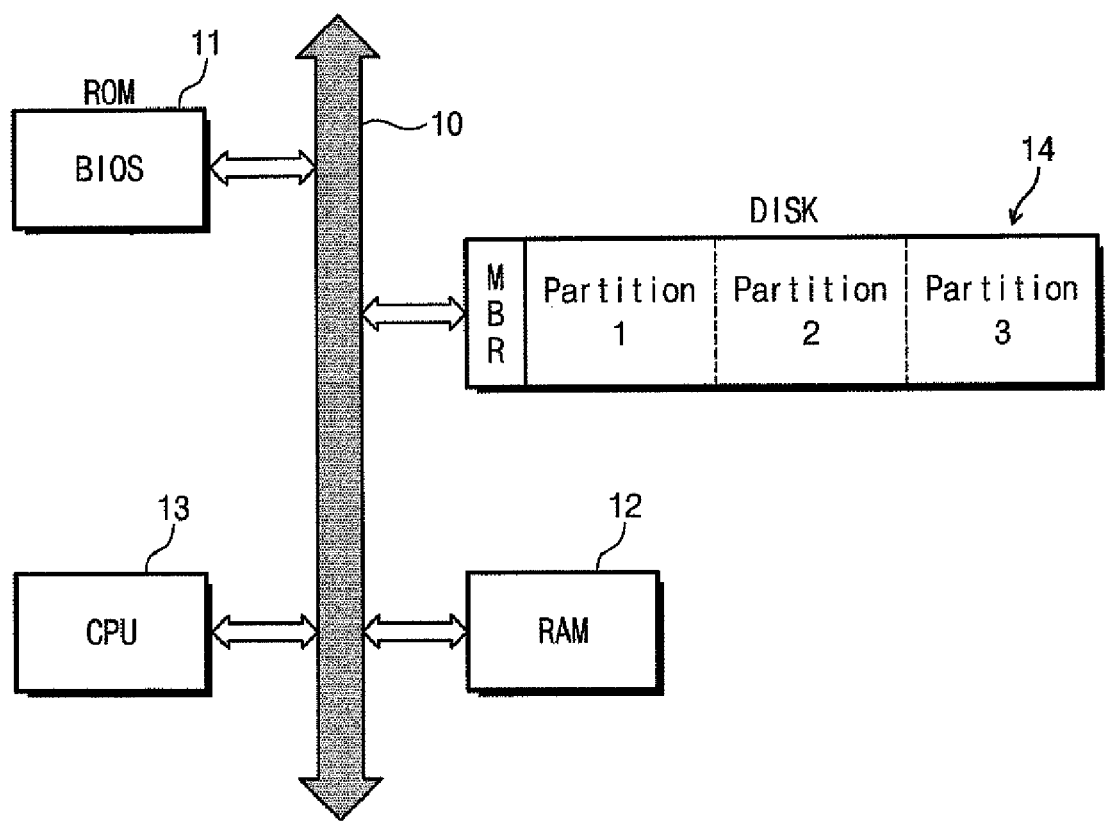
FIG. 12 is a system level diagram of a memory system according to embodiments of the present invention.

FIG. 12 is a block diagram a computer system according to an embodiment of the present invention. As shown, the computer system includes a bus system 10, and a read-only memory (ROM) 11 which is connected to the bus system 10 and stores software (e.g., BIOS) utilized to initialize the computer system. The computer system also includes a random access memory 12 which functions as a working memory, a central processing unit 13, and a solid state memory system 14 all connected to the bus system 10. The solid state memory system includes solid state memory and a controller (e.g., see FIG. 1). Also, in the example illustrated in FIG. 12, the solid state memory system includes a Master Boot Record and is logically divided into plural partitions. As described in connection with previous embodiments herein, the controller of the solid state memory system is configured to logically partition the solid state memory, update metadata of the logically partitioned solid state memory, and monitor the updated metadata to locate invalid data stored in the solid state memory system.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of operating a solid state memory system, comprising logically partitioning the solid state memory system, updating metadata of the logically partitioned solid state memory and monitoring the updated metadata to locate invalid data stored in the solid state memory system, wherein the metadata is storage level metadata, wherein the metadata is contained in a partition table, and wherein invalid data is located in accordance with changes in the metadata of the partition table.

2. The method of claim 1, wherein the partition table is contained in a Master Boot Record (MBR).

3. The method of claim 1, wherein the partition table is contained in a Globally Unique Identifier (GUID) Partition Table (GPT).

4. A method of operating a logically partitioned solid state memory system, comprising determining whether partition metadata of the solid state memory has changed, and analyzing the partition metadata to locate invalid data stored in the solid state memory, wherein analyzing the partition metadata includes determining that a file system type of a partition has changed, and invalidating data in response to the changed file system type.

5. A method of operating a logically partitioned solid state memory system, comprising determining whether partition metadata of the solid state memory has changed, and analyzing the partition metadata to locate invalid data stored in the solid state memory, wherein analyzing the partition metadata includes determining that a partition has changed, and invalidating data in response to the changed partition.

6. A method of operating a logically partitioned solid state memory system, comprising determining whether partition metadata of the solid state memory has changed, and analyzing the partition metadata to locate invalid data stored in the solid state memory, wherein the partition metadata is contained in a Master Boot Record (MBR).

7. A method of operating a logically partitioned solid state memory system, comprising determining whether partition metadata of the solid state memory has changed, and analyzing the partition metadata to locate invalid data stored in the solid state memory, wherein the partition metadata is contained in a Globally Unique Identifier (GUID) Partition Table (GPT).

8. A solid state memory system comprising a solid state memory and a controller, wherein the controller is configured to logically partition the solid state memory, update metadata of the logically partitioned solid state memory, and monitor the updated metadata to locate invalid data stored in the solid state memory system, wherein the metadata is storage level metadata, wherein the metadata is contained in a partition table, and wherein invalid data is located in accordance with changes in the metadata of the partition table.

9. The solid state memory system of claim 8, wherein the partition table is contained in a Master Boot Record (MBR).

10. The solid state memory system of claim 8, wherein the partition table is contained in a Globally Unique Identifier (GUID) Partition Table (GPT).

11. A computer system, comprising:

a bus system;

a read-only memory which is connected to the bus system and stores software utilized to initialize the computer system;

a random access memory which is connected to the bus system and functions as a working memory;

a central processing unit which is connected to the bus system; and a solid state memory system which is connected to the bus system and includes a solid state memory and a controller, wherein the controller is configured to logically partition the solid state memory, update metadata of the logically partitioned solid state memory, and monitor the updated metadata to locate invalid data stored in the solid state memory system wherein the metadata is storage level metadata, wherein the metadata is contained in a partition table, and wherein invalid data is located in accordance with changes in the metadata of the partition table.

\* \* \* \* \*